US012692884B2

(12) United States Patent (10) Patent No.: US 12,692,884 B2
Sisco et al. (45) Date of Patent: Jul. 28, 2026

(54) FASTENER SYSTEMS AND METHODS FOR JOINING MULTIPLE SUBSTRATES OF WORKPIECE

(71) Applicant: The Boeing Company, Arlington, VA (US)

(72) Inventors: Farahnaz Sisco, Mukilteo, WA (US); Nathan A. Muntz, Everett, WA (US)

(73) Assignee: The Boeing Company, Arlington, VA (US)

( * ) Notice: Subject to any disclaimer, the term of this patent is extended or adjusted under 35 U.S.C. 154(b) by 441 days.

(21) Appl. No.: 18/354,922

(22) Filed: Jul. 19, 2023

(65) Prior Publication Data

US 2025/0027520 A1 Jan. 23, 2025

(51) Int. Cl.
*F16B 5/02* (2006.01)
*F16B 37/14* (2006.01)
(52) U.S. Cl.
CPC .............. *F16B 5/02* (2013.01); *F16B 37/14* (2013.01)
(58) Field of Classification Search
CPC ................................. F16B 37/145; F16B 5/02
USPC ............................................. 411/69, 338, 339
See application file for complete search history.

(56) References Cited

U.S. PATENT DOCUMENTS 1,150,114 A * 8/1915 Hays ........................ G02C 1/02
411/338
2,348,589 A * 5/1944 Auten ................... F16B 37/005
411/339

3,414,304 A * 12/1968 Miller ................... F16B 37/145
411/339
3,515,419 A * 6/1970 Baugh ................. F16B 19/1027
411/339
3,702,087 A * 11/1972 Schmitt ............... F16B 19/1027
411/362
3,962,775 A * 6/1976 King, Jr. ................. F16B 4/004
29/445
4,010,519 A 3/1977 Worthing
(Continued)

FOREIGN PATENT DOCUMENTS

DE 102005041350 A1 3/2007
EP 2721311 B1 3/2018
EP 3932798 A1 1/2022

OTHER PUBLICATIONS

European Patent Office, Extended European Search Report, App. No. 24178624.3 (Nov. 8, 2024).

*Primary Examiner* — Flemming Saether
(74) *Attorney, Agent, or Firm* — Walters & Wasylyna LLC

(57) ABSTRACT

A fastener system for joining substrates of a workpiece with working and blind sides includes a binding barrel and a bolt. The binding barrel includes a cylindrical body with a proximal end, a distal end, a central bore and a flange. The central bore includes a counterbored portion and a threaded portion with internal threads. The binding barrel is inserted in a joining bore from the blind side. The barrel flange limits insertion of the binding barrel. The cylindrical body includes an outer surface with a lubricious coating. The bolt includes a head portion, a threaded portion and a shank portion. The bolt is inserted in the joining bore from the working side. The threaded portion engages with the binding barrel. As the bolt becomes fully engaged, the bolt causes radial expansion of the binding barrel, and the binding barrel provides an interference fit within the joining bore.

20 Claims, 13 Drawing Sheets

(56)  References Cited

U.S. PATENT DOCUMENTS

| | | | | |
|---|---|---|---|---|
| 4,048,898 | A | | 9/1977 | Salter |
| 4,490,083 | A | * | 12/1984 | Rebish .................. F16B 37/122 |
| | | | | 411/338 |
| 5,018,920 | A | * | 5/1991 | Speakman ............... F16B 5/04 |
| | | | | 411/383 |
| 8,322,958 | B2 | * | 12/2012 | Haylock ................. F16B 19/02 |
| | | | | 411/339 |
| 9,353,778 | B2 | * | 5/2016 | Chalverat ................. F16B 5/02 |
| 2010/0251661 | A1 | * | 10/2010 | Illgner .................. F16B 33/004 |
| | | | | 411/372.5 |
| 2017/0146045 | A1 | | 5/2017 | Bickford et al. |
| 2018/0193900 | A1 | | 7/2018 | Gunther et al. |
| 2019/0063485 | A1 | | 2/2019 | Khosravani et al. |
| 2019/0301513 | A1 | | 10/2019 | Morden et al. |
| 2019/0301518 | A1 | | 10/2019 | Morden et al. |
| 2019/0383319 | A1 | | 12/2019 | Simpson et al. |
| 2020/0291979 | A1 | | 9/2020 | Cowles et al. |
| 2020/0309173 | A1 | | 10/2020 | Simpson et al. |
| 2021/0180636 | A1 | | 6/2021 | Hansen et al. |
| 2021/0210873 | A1 | | 7/2021 | Hansen et al. |
| 2022/0316518 | A1 | | 10/2022 | Ross et al. |

* cited by examiner

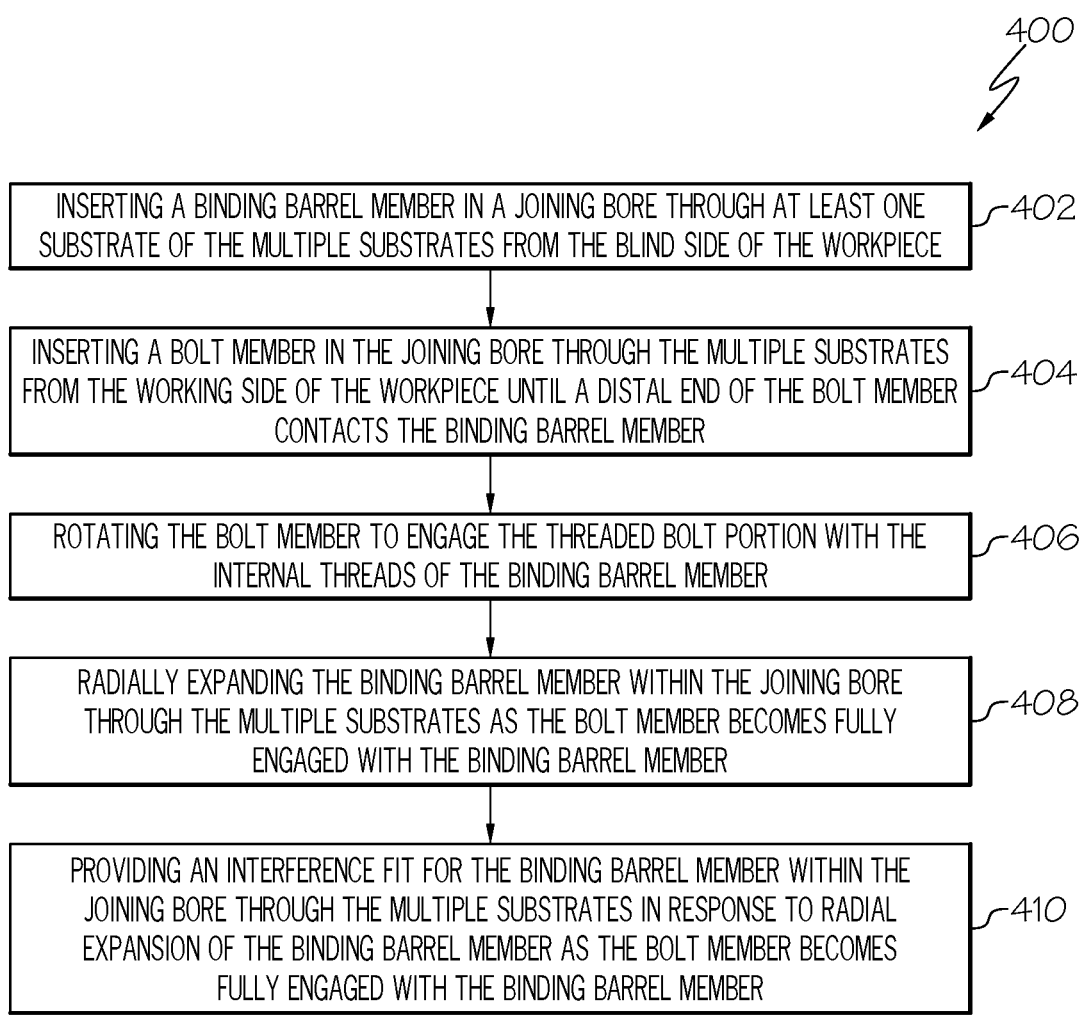

400

INSERTING A BINDING BARREL MEMBER IN A JOINING BORE THROUGH AT LEAST ONE SUBSTRATE OF THE MULTIPLE SUBSTRATES FROM THE BLIND SIDE OF THE WORKPIECE — 402

INSERTING A BOLT MEMBER IN THE JOINING BORE THROUGH THE MULTIPLE SUBSTRATES FROM THE WORKING SIDE OF THE WORKPIECE UNTIL A DISTAL END OF THE BOLT MEMBER CONTACTS THE BINDING BARREL MEMBER — 404

ROTATING THE BOLT MEMBER TO ENGAGE THE THREADED BOLT PORTION WITH THE INTERNAL THREADS OF THE BINDING BARREL MEMBER — 406

RADIALLY EXPANDING THE BINDING BARREL MEMBER WITHIN THE JOINING BORE THROUGH THE MULTIPLE SUBSTRATES AS THE BOLT MEMBER BECOMES FULLY ENGAGED WITH THE BINDING BARREL MEMBER — 408

PROVIDING AN INTERFERENCE FIT FOR THE BINDING BARREL MEMBER WITHIN THE JOINING BORE THROUGH THE MULTIPLE SUBSTRATES IN RESPONSE TO RADIAL EXPANSION OF THE BINDING BARREL MEMBER AS THE BOLT MEMBER BECOMES FULLY ENGAGED WITH THE BINDING BARREL MEMBER — 410

FIG. 4

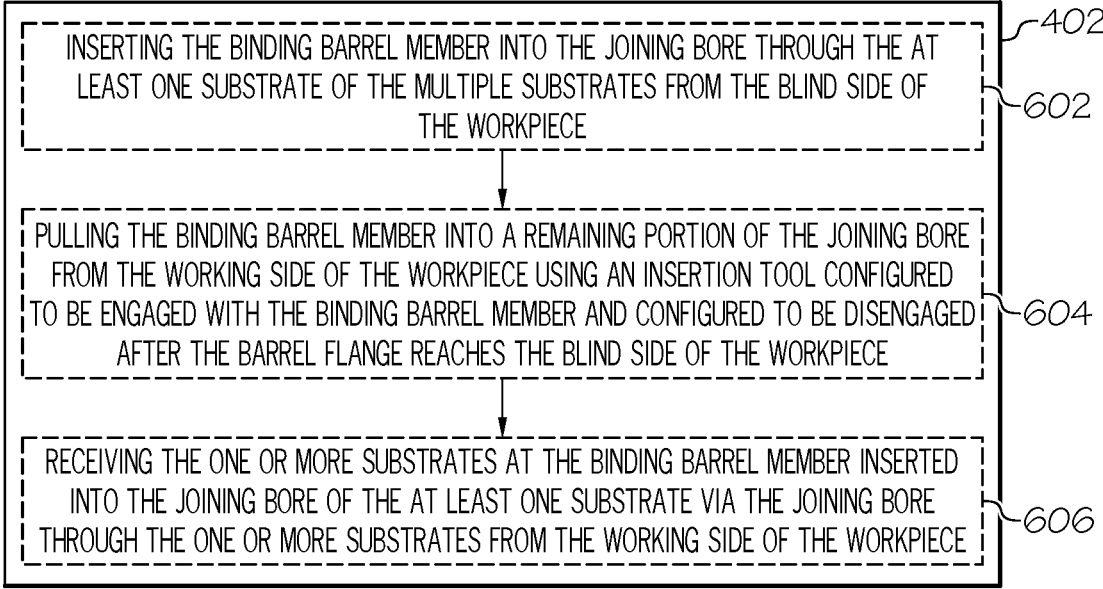

INSERTING THE BINDING BARREL MEMBER INTO THE JOINING BORE THROUGH THE AT LEAST ONE SUBSTRATE OF THE MULTIPLE SUBSTRATES FROM THE BLIND SIDE OF THE WORKPIECE — 402 / 602

PULLING THE BINDING BARREL MEMBER INTO A REMAINING PORTION OF THE JOINING BORE FROM THE WORKING SIDE OF THE WORKPIECE USING AN INSERTION TOOL CONFIGURED TO BE ENGAGED WITH THE BINDING BARREL MEMBER AND CONFIGURED TO BE DISENGAGED AFTER THE BARREL FLANGE REACHES THE BLIND SIDE OF THE WORKPIECE — 604

RECEIVING THE ONE OR MORE SUBSTRATES AT THE BINDING BARREL MEMBER INSERTED INTO THE JOINING BORE OF THE AT LEAST ONE SUBSTRATE VIA THE JOINING BORE THROUGH THE ONE OR MORE SUBSTRATES FROM THE WORKING SIDE OF THE WORKPIECE — 606

FIG. 6

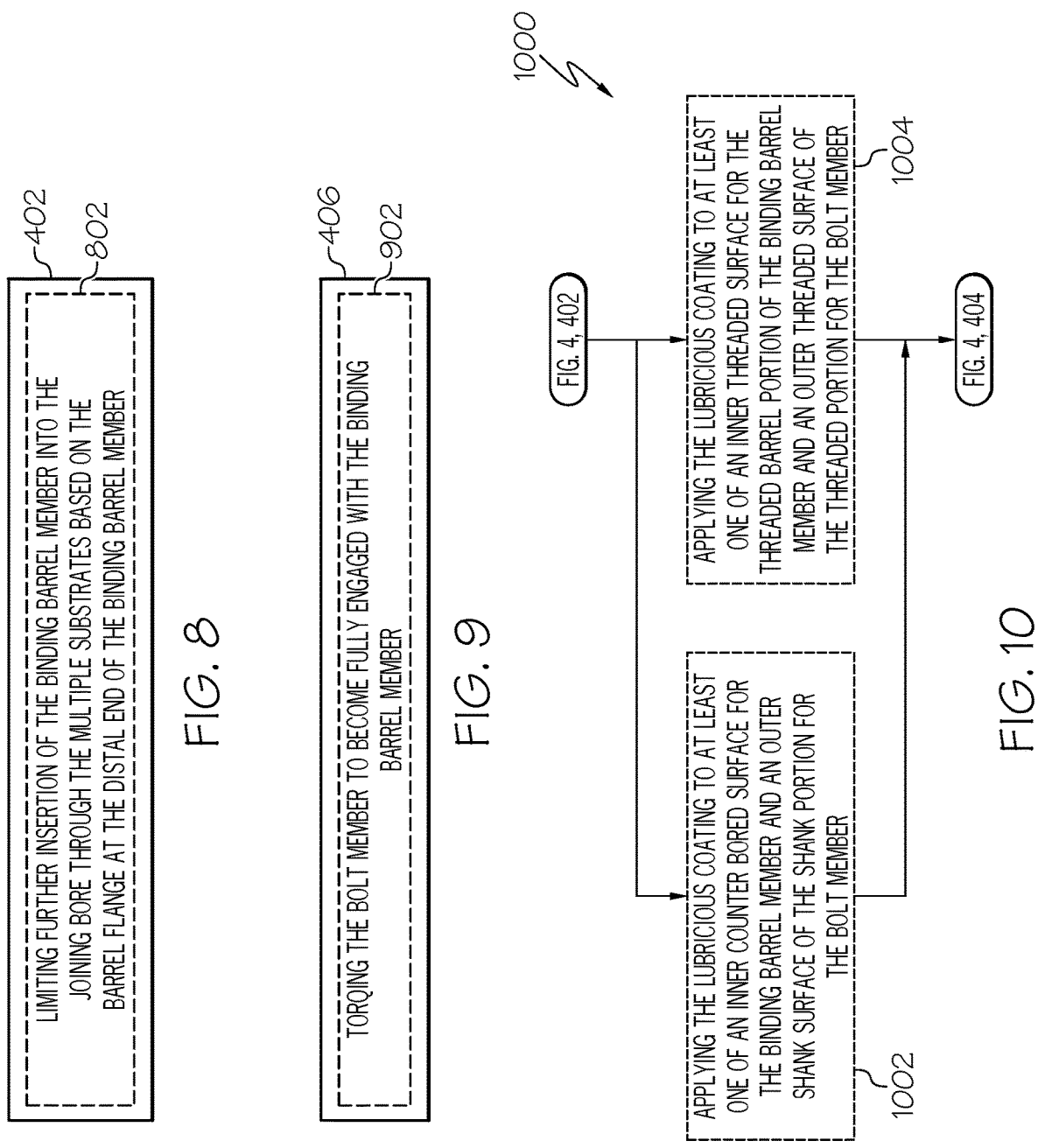

LIMITING FURTHER INSERTION OF THE BINDING BARREL MEMBER INTO THE JOINING BORE THROUGH THE MULTIPLE SUBSTRATES BASED ON THE BARREL FLANGE AT THE DISTAL END OF THE BINDING BARREL MEMBER

FIG. 8

TORQING THE BOLT MEMBER TO BECOME FULLY ENGAGED WITH THE BINDING BARREL MEMBER

APPLYING THE LUBRICIOUS COATING TO AT LEAST ONE OF AN INNER COUNTER BORED SURFACE FOR THE BINDING BARREL MEMBER AND AN OUTER SHANK SURFACE OF THE SHANK PORTION FOR THE BOLT MEMBER

APPLYING THE LUBRICIOUS COATING TO AT LEAST ONE OF AN INNER THREADED SURFACE FOR THE THREADED BARREL PORTION OF THE BINDING BARREL MEMBER AND AN OUTER THREADED SURFACE OF THE THREADED PORTION FOR THE BOLT MEMBER

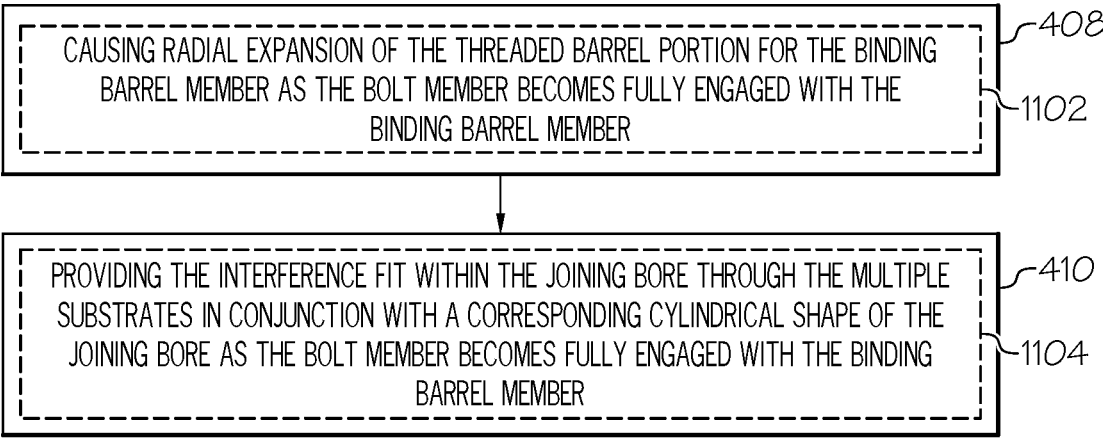

CAUSING RADIAL EXPANSION OF THE THREADED BARREL PORTION FOR THE BINDING BARREL MEMBER AS THE BOLT MEMBER BECOMES FULLY ENGAGED WITH THE BINDING BARREL MEMBER — 408 / 1102

PROVIDING THE INTERFERENCE FIT WITHIN THE JOINING BORE THROUGH THE MULTIPLE SUBSTRATES IN CONJUNCTION WITH A CORRESPONDING CYLINDRICAL SHAPE OF THE JOINING BORE AS THE BOLT MEMBER BECOMES FULLY ENGAGED WITH THE BINDING BARREL MEMBER — 410 / 1104

FIG. 11

FASTENER SYSTEMS AND METHODS FOR JOINING MULTIPLE SUBSTRATES OF WORKPIECE

FIELD

The present disclosure relates generally to fastener systems for joining multiple substrates of a workpiece and, particularly, to fastener systems that provide an interference fit with a workpiece that includes one or more composite substrate. Conductive properties of the various fastener systems provide protection from electromagnetic effects. Various configurations of the fastener systems provide a pre-installed binding barrel member on a blind side of the workpiece and a bolt member for one-sided installation from a working side.

BACKGROUND

Current binding barrel fasteners are not utilized in interference fit installations and do not extend through the entirety of the workpiece stack up. Moreover, current binding barrel fasteners would cause delamination and/or damage to the stack up if installed with an interference fit. Thus, current binding barrel fasteners are suitable for electromagnetic energy protection of the workpiece.

Accordingly, those skilled in the art continue with research and development efforts to improve fastener systems for joining multiple substrates of a workpiece.

SUMMARY

Disclosed are examples of fastener systems and methods for joining multiple substrates of a workpiece. The following is a non-exhaustive list of examples, which may or may not be claimed, of the subject matter according to the present disclosure.

In an example, a fastener system for joining multiple substrates of a workpiece is disclosed. The workpiece has a working side and a blind side. The fastener system includes a binding barrel member and a bolt member. The binding barrel member includes a cylindrical barrel body with a proximal end, a distal end, a central bore in the cylindrical barrel body and a barrel flange adjacent to the distal end of the cylindrical barrel body. The central bore includes a counterbored barrel portion and a threaded barrel portion with internal threads. The binding barrel member configured for insertion in a joining bore through at least one substrate of the multiple substrates from the blind side of the workpiece. The barrel flange is configured to limit further insertion of the binding barrel member into the joining bore. The cylindrical barrel body includes an outer barrel surface with a lubricious coating. The bolt member includes a head portion, a threaded bolt portion and a shank portion extending between the head portion and the threaded bolt portion. The bolt member configured for insertion in the joining bore through the multiple substrates from the working side of the workpiece until a distal end of the bolt member contacts the binding barrel member. The threaded bolt portion is configured for threaded engagement with the internal threads of the binding barrel member after contacting the binding barrel member. As the bolt member becomes fully engaged with the binding barrel member, the bolt member is configured to cause radial expansion of the binding barrel member and the binding barrel member is configured to provide an interference fit within the joining bore through the multiple substrates.

In an example, a method for joining multiple substrates of a workpiece is disclosed. The workpiece has a working side and a blind side. The method includes: (1) inserting a binding barrel member in a joining bore through at least one substrate of the multiple substrates from the blind side of the workpiece, the binding barrel member includes a cylindrical barrel body with a proximal end, a distal end and a central bore in the cylindrical barrel body, the central bore includes a counterbored barrel portion and a threaded barrel portion with internal threads, the binding barrel member also includes a barrel flange adjacent to the distal end of the cylindrical barrel body, the barrel flange configured to limit further insertion of the binding barrel member into the joining bore, the cylindrical barrel body also includes an outer barrel surface with a lubricious coating; (2) inserting a bolt member in the joining bore through the multiple substrates from the working side of the workpiece until a distal end of the bolt member contacts the binding barrel member, the bolt member includes a head portion, a threaded bolt portion and a shank portion extending between the head portion and the threaded bolt portion; (3) rotating the bolt member to engage the threaded bolt portion with the internal threads of the binding barrel member; (4) radially expanding the binding barrel member within the joining bore through the multiple substrates as the bolt member becomes fully engaged with the binding barrel member; and (5) providing an interference fit for the binding barrel member within the joining bore through the multiple substrates in response to radial expansion of the binding barrel member as the bolt member becomes fully engaged with the binding barrel member.

In an example, another fastener system for joining multiple substrates of a workpiece is disclosed. The multiple substrates include at least one composite material substrate. The workpiece has a working side and a blind side. The fastener system includes a binding barrel member, a cap sealant member and a bolt member. The binding barrel member includes a cylindrical barrel body with a proximal end, a distal end, a central bore in the cylindrical barrel body with internal threads and a barrel flange adjacent to the distal end of the cylindrical barrel body. The central bore includes a counterbored barrel portion and a threaded barrel portion with internal threads. The binding barrel member configured for insertion in a joining bore through at least one substrate of the multiple substrates from the blind side of the workpiece. The barrel flange is configured to limit further insertion of the binding barrel member into the joining bore. The cylindrical barrel body includes an outer barrel surface with a lubricious coating. The cap sealant member includes a dome and a cap flange. The cap sealant member configured for placement over the binding barrel member. The cap flange configured to secure the cap sealant member to the blind side of the workpiece. The bolt member includes a head portion, a threaded bolt portion and a shank portion extending between the head portion and the threaded bolt portion. The bolt member configured for insertion in the joining bore through the multiple substrates from the working side of the workpiece until a distal end of the bolt member contacts the binding barrel member. The threaded bolt portion is configured for threaded engagement with the internal threads of the binding barrel member after contacting the binding barrel member. At least one of i) an outer threaded diameter for the threaded bolt portion of the bolt member is substantially greater than an inner threaded diameter for the threaded barrel portion of the binding barrel member and ii) an outer shank diameter for the shank portion of the bolt member is substantially greater than an inner counterbored diameter for the counterbored barrel portion of the binding barrel member. As the bolt member becomes fully engaged with the binding barrel member, the bolt member is configured to cause radial expansion of the binding barrel member and the binding barrel member is configured to provide an interference fit within the joining bore through the multiple substrates.

Other examples of the disclosed fastener systems and methods for joining multiple substrates of a workpiece will become apparent from the following detailed description, the accompanying drawings and the appended claims.

BRIEF DESCRIPTION OF THE DRAWINGS

FIG. 4 is a flow diagram of an example of a method for joining multiple substrates of a workpiece;

FIG. 6 is a flow diagram showing another further example of "inserting a binding barrel member" from the method of FIG. 4;

FIG. 8 is a flow diagram showing a further example of "inserting a binding barrel member" from the method of FIG. 4;

FIG. 9 is a flow diagram showing a further example of "rotating the bolt member" from the method of FIG. 4;

FIG. 10 in combination with FIG. 4, is a flow diagram of yet another example of a method for joining multiple substrates of a workpiece;

FIG. 11 is a flow diagram showing further examples of "radially expanding" and "providing an interference fit" from the method of FIG. 4;

DETAILED DESCRIPTION

The various examples of fastener systems and methods for joining multiple substrates of a workpiece disclosed herein provide techniques for pre-installing a binding barrel member of the fastener system on a blind side of the workpiece and one-sided installation of a bolt member of the fastener system from a working side of the workpiece. The workpiece, for example, may include one or more composite material substrates and may be used for aerospace construction.

Figure 1:
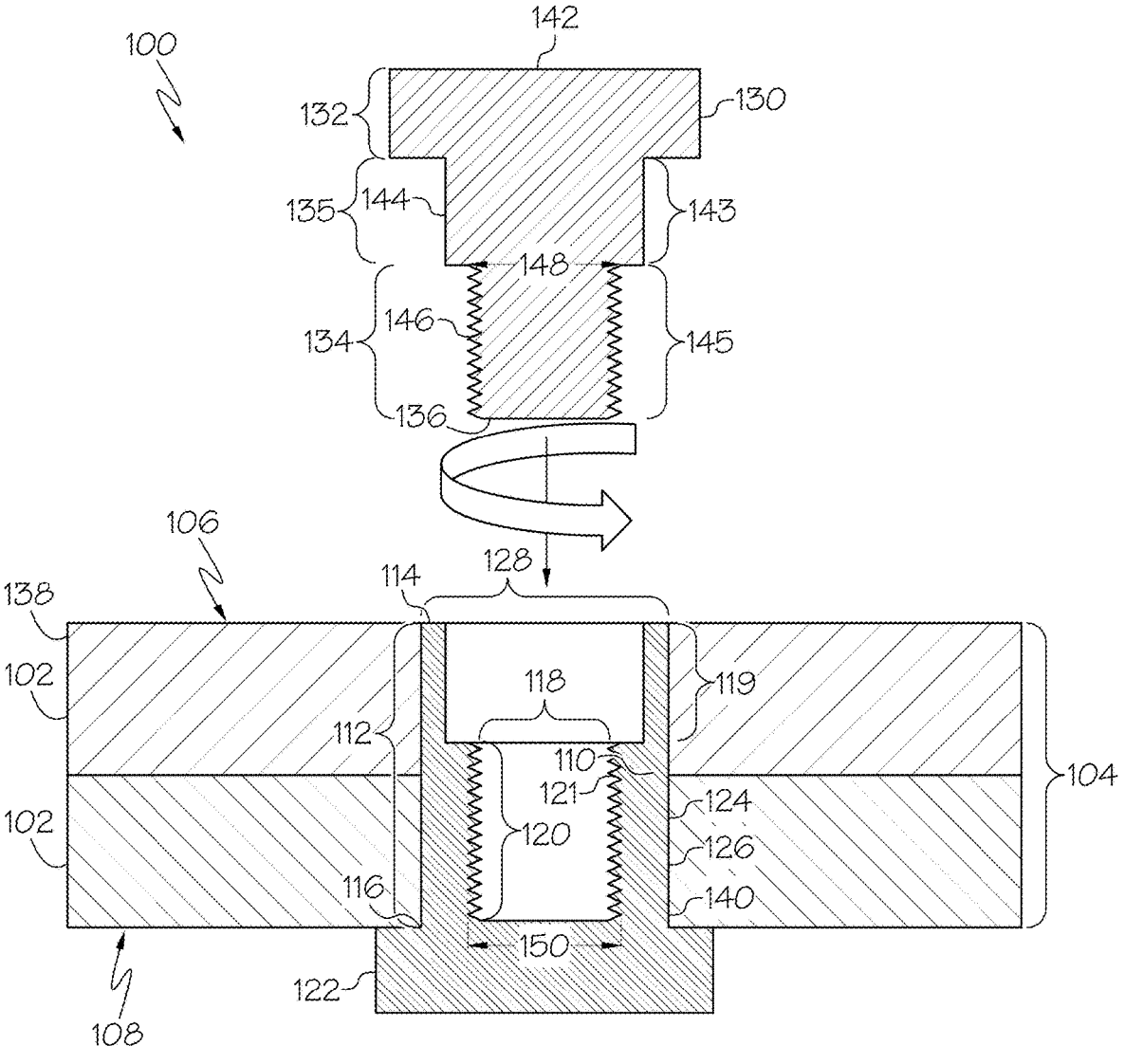
FIG. 1 is a cross-sectional side view of an example of a partially installed fastener system for joining multiple substrates of a workpiece.
Figure 2A:
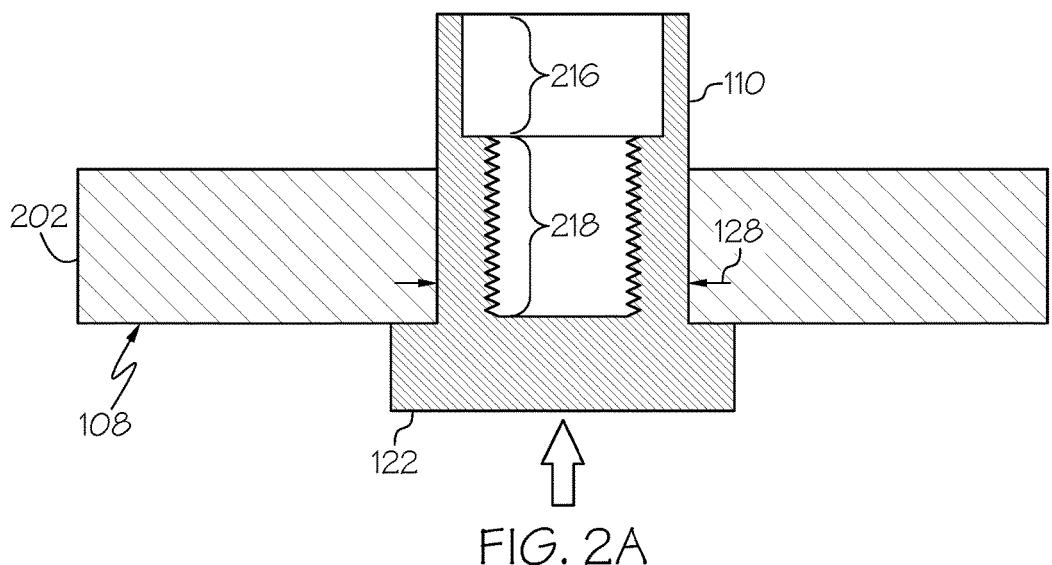
FIG. 2A is a cross-sectional side view of an example of a binding barrel member of the fastener system of FIG. 1 installed in a substrate of the workpiece from a blind side.
Figure 2B:
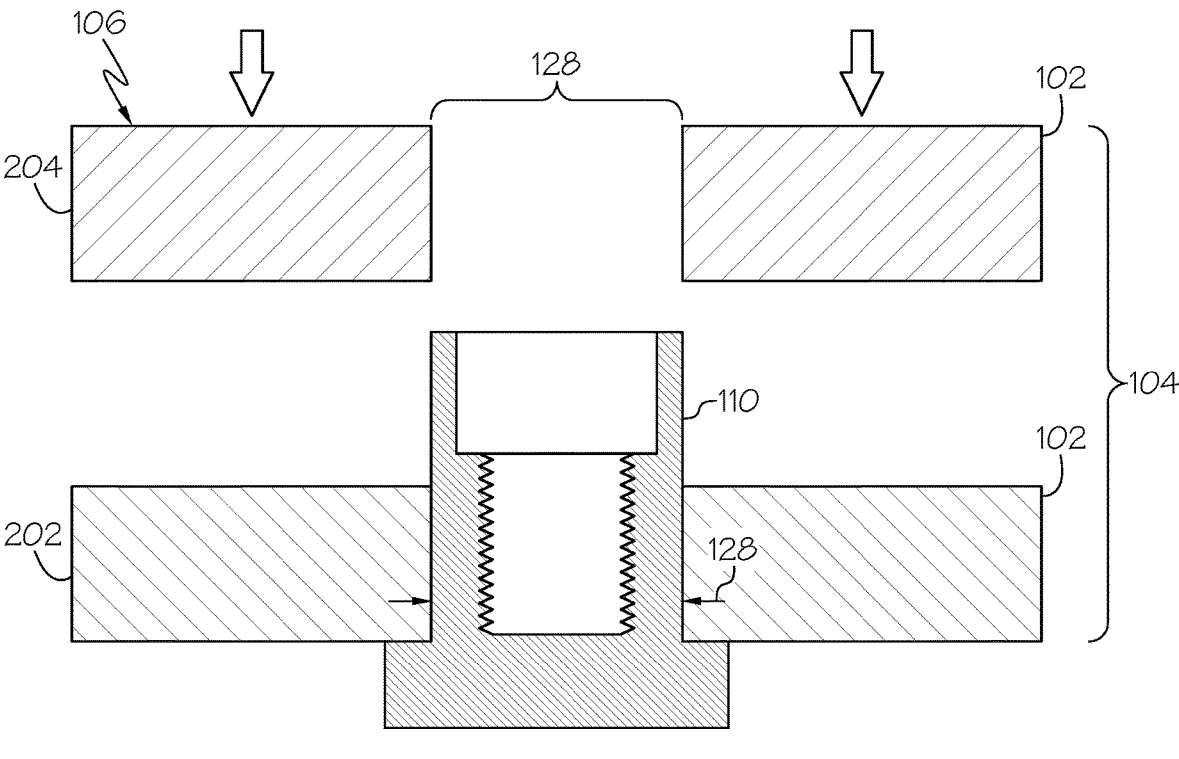
FIG. 2B is a cross-sectional side view of an example of the partially installed binding barrel member of FIG. 2A prepared for installation of a substrate of the workpiece from a working side.
Figure 2C:
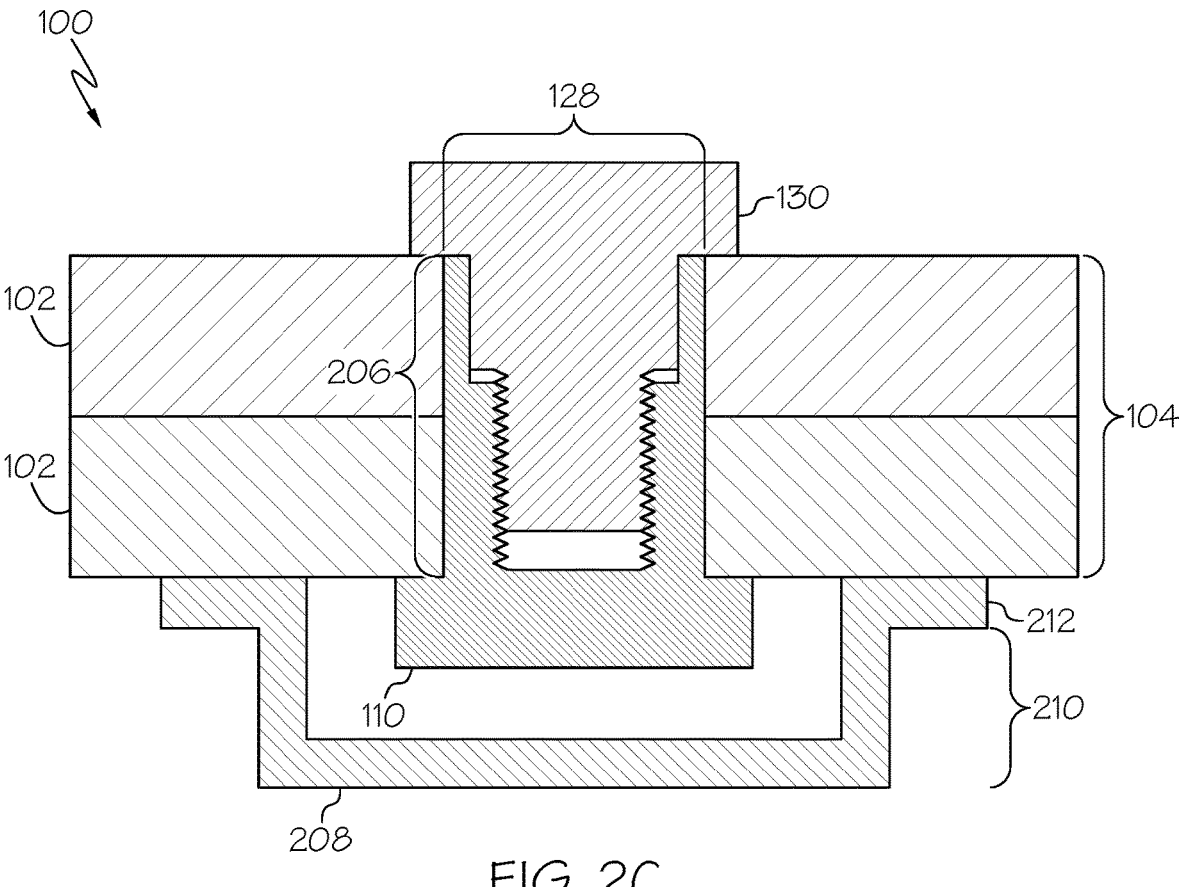
FIG. 2C is a cross-sectional side view of the fastener system of FIG. 1 in which the fastener system is fully installed.
Figure 3A:
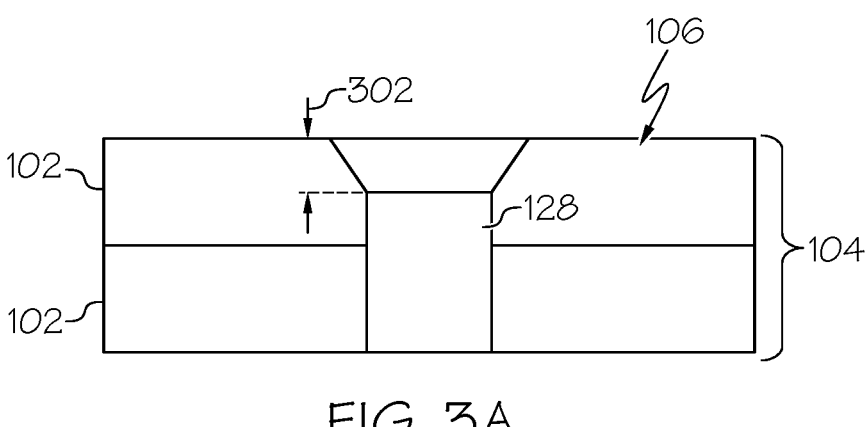
FIGS. 3A-C are cross-sectional side views of examples of countersunk, counterbored and cylindrical joining bores in workpieces having multiple substrates.
Figure 3B:
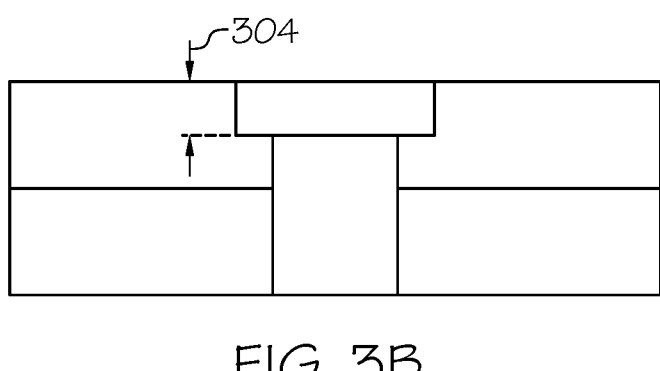
Figure 3C:
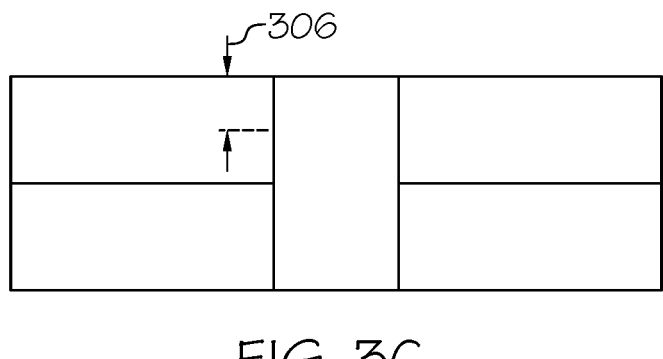
Figure 5:
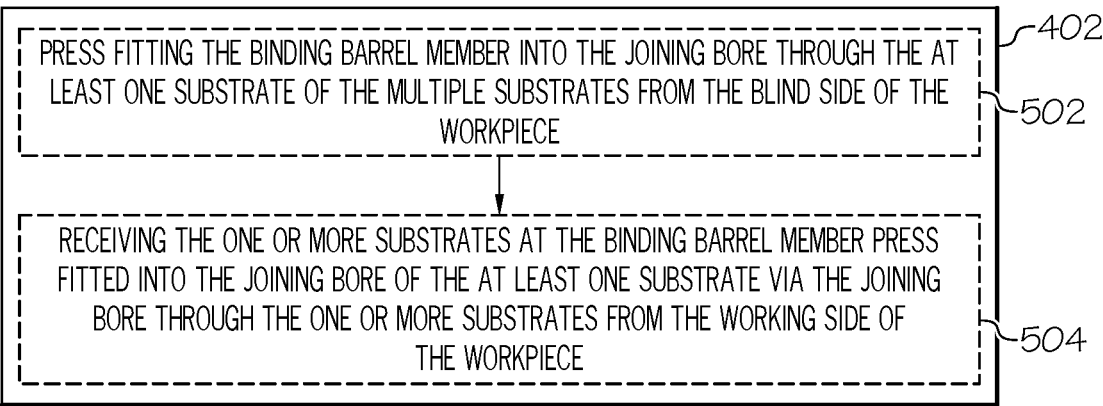
FIG. 5 is a flow diagram showing a further example of "inserting a binding barrel member" from the method of FIG. 4.

Referring generally to FIGS. 1, 2A-C and 3 A-C, by way of examples, the present disclosure is directed to a fastener system 100 for joining multiple substrates 102 of a workpiece 104. The workpiece 104 has a working side 106 and a blind side 108. FIG. 1 discloses a partially installed example of the fastener system 100. FIG. 2A discloses an example of a binding barrel member 110 installed in a substrate of the workpiece from the blind side 108. FIG. 2B discloses an example of the binding barrel member 110 prepared for installation of a substrate of the workpiece from the working side 106. FIG. 2C discloses a fully installed example of the fastener system 100. FIGS. 3A-C show examples of joining bores 128 in the workpiece 104 of FIG. 1 with a countersunk portion 302, a counterbored portion 304 and a cylindrical portion 306.

With reference again to 1, 2A-C and 3 A-C, in one or more examples, a fastener system 100 for joining multiple substrates 102 of a workpiece 104 includes a binding barrel member 110 and a bolt member 130. The workpiece 104 has a working side 106 and a blind side 108. The binding barrel member 110 includes a cylindrical barrel body 112 with a proximal end 114, a distal end 116, a central bore 118 in the cylindrical barrel body 112 and a barrel flange 122 adjacent to the distal end 116 of the cylindrical barrel body 112. The central bore 118 includes a counterbored barrel portion 119 and a threaded barrel portion 120 with internal threads 121. The binding barrel member 110 configured for insertion in a joining bore 128 through at least one substrate 202 of the multiple substrates 102 from the blind side 108 of the workpiece 104. The barrel flange 122 configured to limit further insertion of the binding barrel member 110 into the joining bore 128. The cylindrical barrel body 112 includes an outer barrel surface 124 with a lubricious coating 126. The bolt member 130 includes a head portion 132, a threaded bolt portion 134 and a shank portion 135 extending between the head portion 132 and the threaded bolt portion 134. The bolt member 130 configured for insertion in the joining bore 128 through the multiple substrates 102 from the working side 106 of the workpiece 104 until a distal end 136 of the bolt member 130 contacts the binding barrel member 110. The threaded bolt portion 134 configured for threaded engagement with the internal threads 121 of the binding barrel member 110 after contacting the binding barrel member 110. As the bolt member 130 becomes fully engaged with the binding barrel member 110, the bolt member 130 is configured to cause radial expansion of the binding barrel member 110 and the binding barrel member 110 is configured to provide an interference fit 206 within the joining bore 128 through the multiple substrates 102.

In another example of the fastener system 100, the multiple substrates 102 include at least one composite material substrate 138.

In yet another example of the fastener system 100, the binding barrel member 110 is configured to be press fit into the joining bore 128 through the at least one substrate 202 of the multiple substrates 102 from the blind side 108 of the workpiece 104. In a further example, where the binding barrel member 110 is not press fit into the joining bore 128 through one or more substrates 204 of the multiple substrates 102, the binding barrel member 110 press fitted into the joining bore 128 of the at least one substrate 202 is configured to receive the one or more substrates 204 via the joining bore 128 through the one or more substrates 204 from the working side 106 of the workpiece 104.

In still another example of the fastener system 100, the binding barrel member 110 is configured to be inserted into the joining bore 128 through the at least one substrate 202 of the multiple substrates 102 from the blind side 108 of the workpiece 104 and pulled into a remaining portion of the joining bore 128 from the working side 106 of the workpiece 104 using an insertion tool configured to be engaged with the binding barrel member 110 and configured to be disengaged after the barrel flange 122 reaches the blind side 108 of the workpiece 104. In a further example, where the binding barrel member 110 is not inserted into the joining bore 128 through one or more substrates 204 of the multiple substrates 102, the binding barrel member 110 inserted into the joining bore 128 of the at least one substrate 202 is configured to receive the one or more substrates 204 via the joining bore 128 through the one or more substrates 204 from the working side 106 of the workpiece 104.

In still yet another example, the fastener system 100 also includes a cap sealant member 208 with a dome 210 and a cap flange 212. The cap sealant member 208 is configured for placement over the binding barrel member 110. The cap flange 212 configured to secure the cap sealant member 208 to the blind side 108 of the workpiece 104.

In another example of the fastener system 100, the binding barrel member 110 includes a metallic material. In a further example, the metallic material includes a stainless steel, titanium, a titanium alloy, a cobalt-chromium alloy, a nickel-titanium alloy or any other suitable metallic material in any suitable combination.

In yet another example of the fastener system 100, the lubricious coating 126 includes indium, an indium alloy, tin, a tin alloy, bismuth, a bismuth alloy, aluminum, an aluminum alloy or any other suitable lubricious coating in any suitable combination.

In still another example of the fastener system 100, the lubricious coating 126 on the outer barrel surface 124 includes conductive features configured to provide electromagnetic energy protection to the workpiece 104 as the bolt member 130 becomes fully engaged with the binding barrel member 110.

In still yet another example of the fastener system 100, the outer barrel surface 124 is coated with a conductive coating 140 to provide electromagnetic energy protection to the workpiece 104 as the bolt member 130 becomes fully engaged with the binding barrel member 110. In a further example, the conductive coating 140 includes indium, an indium alloy, tin, a tin alloy, lead, a lead alloy or any other suitable conducting coating in any suitable combination.

In another example of the fastener system 100, the bolt member 130 includes a metallic material. In a further example, the metallic material includes a stainless steel, titanium, a titanium alloy, a cobalt-chromium alloy, a nickel-titanium alloy or any other suitable metallic material in any suitable combination.

In yet another example of the fastener system 100, the head portion 132 of the bolt member 130 includes a torquing feature 142. In a further example, the torquing feature 142 is configured to facilitate rotation of the bolt member 130 using a hex key torquing tool, a cross tip driver torquing tool, a flat tip driver torquing tool, a hex socket torquing tool or any other suitable torquing tool.

In still another example of the fastener system 100, the head portion 132 of the bolt member 130 includes a protruding head, a flush head, a countersunk head, a raised head, a recessed hexagon socket head, a recessed cross tip head, a recessed flat tip head, a hexagon head or any other suitable type of head.

In still yet another example of the fastener system 100, at the working side 106 of the workpiece 104, the joining bore 128 through the multiple substrates 102 includes a countersunk portion 302, a counterbored portion 304, a cylindrical portion 306 or any other suitable geometry at the working side 106 compatible with the head portion 132 of the bolt member 130.

In another example of the fastener system 100, the binding barrel member 110 also includes an inner counterbored surface 216 for the counterbored barrel portion 119. In this example, the bolt member 130 also includes an outer shank surface 144 for the shank portion 135. At least one of the inner counterbored surface 216 and the outer shank surface 144 is coated with the lubricious coating 126.

In yet another example of the fastener system 100, the binding barrel member 110 also includes an inner threaded surface 218 for the threaded barrel portion 120. In this example, the bolt member 130 also includes an outer threaded surface 146 for the threaded bolt portion 134. At least one of the inner threaded surface 218 and the outer threaded surface 146 is coated with the lubricious coating 126.

In still another example of the fastener system 100, an outer threaded diameter 148 for the threaded bolt portion 134 of the bolt member 130 is substantially greater than an inner threaded diameter 150 for the threaded barrel portion 120 of the binding barrel member 110. In a further example, the outer threaded diameter 148 is substantially greater than the inner threaded diameter 150 by approximately 0.0005 inches, approximately 0.0010 inches, approximately 0.0015 inches, approximately 0.0020 inches, approximately 0.0025 inches or any suitable difference measurement resulting in substantial expansion of the binding barrel member 110. In another further example, the outer threaded diameter 148 is substantially greater than the inner threaded diameter 150 by approximately 0.2 percent, approximately 0.4 percent, approximately 0.6 percent, approximately 0.8 percent, approximately 1.0 percent or any other suitable percentage resulting in substantial expansion of the binding barrel member 110.

In still yet another example of the fastener system 100, an outer shank diameter for the shank portion 135 of the bolt member 130 is substantially greater than an inner counterbored diameter for the counterbored barrel portion 119 of the binding barrel member 110. In a further example, the outer shank diameter is substantially greater than the inner counterbored diameter by approximately 0.0005 inches, approximately 0.0010 inches, approximately 0.0015 inches, approximately 0.0020 inches, approximately 0.0025 inches or any suitable difference measurement resulting in substantial expansion of the binding barrel member 110. In another further example, the outer shank diameter is substantially greater than the inner counterbored diameter by approximately 0.2 percent, approximately 0.4 percent, approximately 0.6 percent, approximately 0.8 percent, approximately 1.0 percent or any other suitable percentage resulting in substantial expansion of the binding barrel member 110.

In another example of the fastener system 100, the threaded bolt portion 134 of the bolt member 130 includes a cylindrical threaded body 145 with an outer threaded surface 146 configured to face the internal threads 121 of the cylindrical barrel body 112 as the bolt member 130 is inserted into the central bore 118 and engaged with the internal threads 121 of the threaded barrel portion 120 for the binding barrel member 110.

In a further example, an outer threaded diameter 148 for the cylindrical threaded body 145 is substantially greater than an inner threaded diameter 150 for the internal threads 121 of the threaded barrel portion 120. In an even further example, the outer threaded diameter 148 is substantially greater than the inner threaded diameter 150 by approximately 0.0005 inches, approximately 0.0010 inches, approximately 0.0015 inches, approximately 0.0020 inches, approximately 0.0025 inches or any suitable difference measurement resulting in substantial expansion of the binding barrel member 110. In another even further example, the outer threaded diameter 148 is substantially greater than the inner threaded diameter 150 by approximately 0.2 percent, approximately 0.4 percent, approximately 0.6 percent, approximately 0.8 percent, approximately 1.0 percent or any other suitable percentage resulting in substantial expansion of the binding barrel member 110.

In another further example, as the bolt member 130 becomes fully engaged with the binding barrel member 110, the outer threaded surface 146 of the bolt member 130 is configured to cause radial expansion of the threaded barrel portion 120 for the binding barrel member 110 and the binding barrel member 110 is configured to provide the interference fit 206 within the joining bore 128 through the multiple substrates 102 in conjunction with a corresponding cylindrical shape of the joining bore 128.

In yet another example of the fastener system 100, the shank portion 135 of the bolt member 130 includes a cylindrical shank body 143 with an outer shank surface 144 configured to face the counterbored barrel portion 119 of the binding barrel member 110 as the bolt member 130 is inserted into the central bore 118 and engaged with the internal threads 121 of the threaded barrel portion 120 for the binding barrel member 110.

In a further example, an outer shank diameter for the cylindrical shank body 143 is substantially greater than an inner counterbored diameter for the counterbored barrel portion 119 of the binding barrel member 110. In an even further example, the outer shank diameter is substantially greater than the inner counterbored diameter by approximately 0.0005 inches, approximately 0.0010 inches, approximately 0.0015 inches, approximately 0.0020 inches, approximately 0.0025 inches or any suitable difference measurement resulting in substantial expansion of the binding barrel member 110. In another even further example, the outer shank diameter is substantially greater than the inner counterbored diameter by approximately 0.2 percent, approximately 0.4 percent, approximately 0.6 percent, approximately 0.8 percent, approximately 1.0 percent or any other suitable percentage resulting in substantial expansion of the binding barrel member 110.

In another further example, as the bolt member 130 becomes fully engaged with the binding barrel member 110, the outer shank surface 144 of the bolt member 130 is configured to cause radial expansion of the counterbored barrel portion 119 for the binding barrel member 110 and the binding barrel member 110 is configured to provide the interference fit 206 within the joining bore 128 through the multiple substrates 102 in conjunction with a corresponding cylindrical shape of the joining bore 128.

Figure 7:
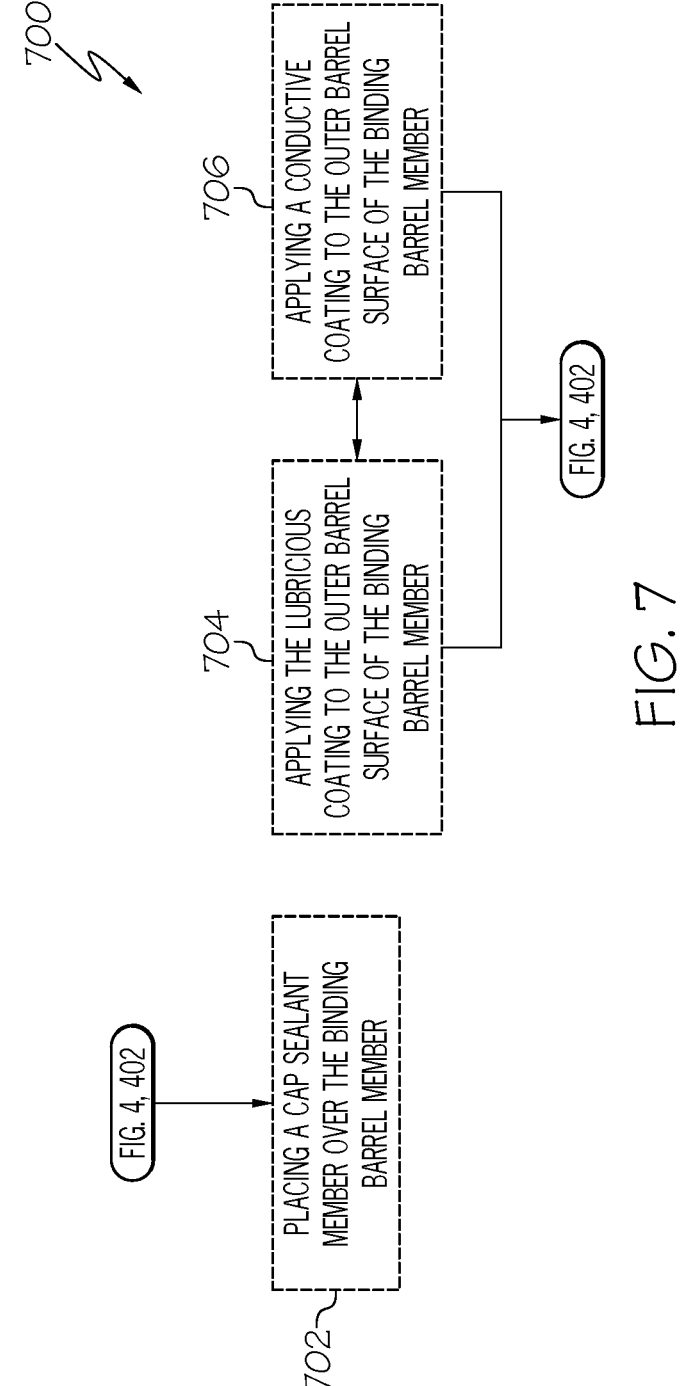
FIG. 7 in combination with FIG. 4, is a flow diagram of another example of a method for joining multiple substrates of a workpiece.
Figure 12:
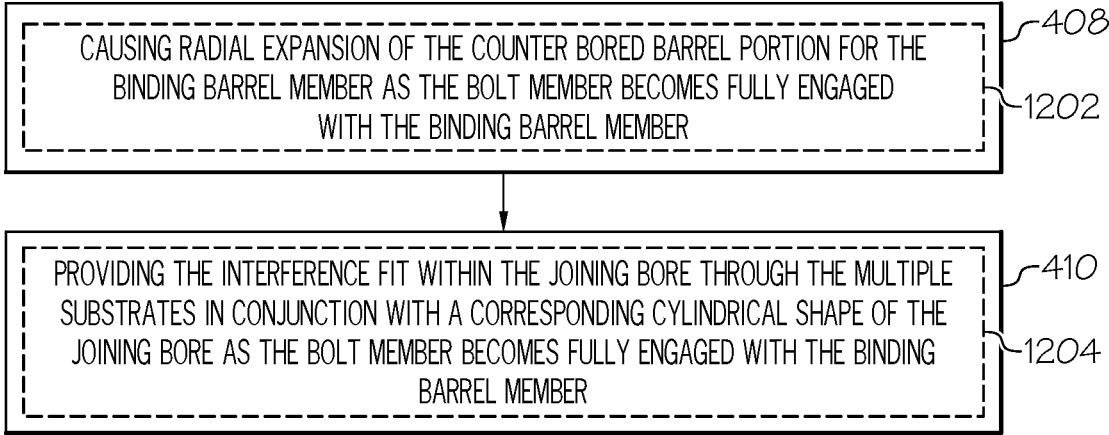
FIG. 12 is a flow diagram showing other further examples of "radially expanding" and "providing an interference fit" from the method of FIG. 4.

Referring generally to FIGS. 1, 2A-C and 4-13, by way of examples, the present disclosure is directed to methods 400, 700, 1000 for joining multiple substrates 102 of a workpiece 104. The workpiece 104 has a working side 106 and a blind side 108. FIG. 1 discloses a partially installed example of the fastener system 100. FIG. 2A discloses an example of a binding barrel member 110 installed in a substrate of the workpiece from the blind side 108. FIG. 2B discloses an example of the binding barrel member 110 prepared for installation of a substrate of the workpiece from the working side 106. FIG. 2C discloses a fully installed example of the fastener system 100. FIGS. 4-6, 8, 9, 11 and 12 disclose several examples of the method 400. FIGS. 4 and 7 disclose several examples of the method 700. FIGS. 4 and 10 disclose several examples of the method 1000.

With reference again to FIGS. 1, 2A-C, 4-6, 8, 9, 11 and 12, in one or more examples, a method 400 (see FIG. 4) for joining multiple substrates 102 of a workpiece 104 with a working side 106 and a blind side 108 includes inserting 402 a binding barrel member 110 in a joining bore 128 through at least one substrate 202 of the multiple substrates 102 from the blind side 108 of the workpiece 104. The binding barrel member 110 includes a cylindrical barrel body 112 with a proximal end 114, a distal end 116 and a central bore 118 in the cylindrical barrel body 112. The central bore 118 includes a counterbored barrel portion 119 and a threaded barrel portion 120 with internal threads 121. The binding barrel member 110 also includes a barrel flange 122 adjacent to the distal end 116 of the cylindrical barrel body 112. The barrel flange 122 configured to limit further insertion of the binding barrel member 110 into the joining bore 128. The cylindrical barrel body 112 also includes an outer barrel surface 124 with a lubricious coating 126. At 404, a bolt member 130 is inserted in the joining bore 128 through the multiple substrates 102 from the working side 106 of the workpiece 104 until a distal end 136 of the bolt member 130 contacts the binding barrel member 110. The bolt member 130 comprises a head portion 132, a threaded bolt portion 134 and a shank portion 135 extending between the head portion 132 and the threaded bolt portion 134. At 406, the bolt member 130 is rotated to engage the threaded bolt portion 134 with the internal threads 121 of the binding barrel member 110. At 408, the binding barrel member 110 is radially expanded within the joining bore 128 through the multiple substrates 102 as the bolt member 130 becomes fully engaged with the binding barrel member 110. At 410, an interference fit 206 is provided for the binding barrel member 110 within the joining bore 128 through the multiple substrates 102 in response to radial expansion of the binding barrel member (110) as the bolt member (130) becomes fully engaged with the binding barrel member (110).

In another example of the method 400, the inserting 402 the binding barrel member 110 includes press fitting 502 (see FIG. 5) the binding barrel member 110 into the joining bore 128 through the at least one substrate 202 of the multiple substrates 102 from the blind side 108 of the workpiece 104. In a further example, where the binding barrel member 110 is not press fit into the joining bore 128 through one or more substrates 204 of the multiple substrates 102, the inserting 402 the binding barrel member 110 also includes receiving 504 the one or more substrates 204 at the binding barrel member 110 press fitted into the joining bore 128 of the at least one substrate 202 via the joining bore 128 through the one or more substrates 204 from the working side 106 of the workpiece 104.

In yet another example of the method 400, the inserting 402 the binding barrel member 110 includes inserting 602 (see FIG. 6) the binding barrel member 110 into the joining bore 128 through the at least one substrate 202 of the multiple substrates 102 from the blind side 108 of the workpiece 104. At 604, the binding barrel member 110 is pulled into a remaining portion of the joining bore 128 from the working side 106 of the workpiece 104 using an insertion tool configured to be engaged with the binding barrel member 110 and configured to be disengaged after the barrel flange 122 reaches the blind side 108 of the workpiece 104 In a further example, where the binding barrel member 110 is not inserted into the joining bore 128 through one or more substrates 204 of the multiple substrates 102, the inserting 402 the binding barrel member 110 also includes receiving 606 the one or more substrates 204 at the binding barrel member 110 inserted into the joining bore 128 of the at least one substrate 202 via the joining bore 128 through the one or more substrates 204 from the working side 106 of the workpiece 104.

With reference again to FIGS. 1, 2A-C, 4 and 7, in one or more examples, a method 700 (see FIG. 7) for joining multiple substrates 102 of a workpiece 104 includes the method 400 of FIG. 4 and continues from 402 to 702 where a cap sealant member 208 is placed over the binding barrel member 110. The cap sealant member 208 includes a dome 210 and a cap flange 212. The cap flange 212 configured to secure the cap sealant member 208 to the blind side 108 of the workpiece 104. In another example, the method 700 includes applying 704 the lubricious coating 126 to the outer barrel surface 124 of the binding barrel member 110. In this example, the method 700 continues from 704 to 402 of FIG. 4. In a further example of the method 700, the lubricious coating 126 on the outer barrel surface 124 includes conductive features configured to provide electromagnetic energy protection to the workpiece 104 as the bolt member 130 becomes fully engaged with the binding barrel member 110. In yet another example, the method 700 includes applying 706 a conductive coating 140 to the outer barrel surface 124. In this example, the method 700 continues from 706 to 402 of FIG. 4.

With reference again to FIGS. 1, 2A-C, 4-6, 8, 9, 11 and 12, in still another example of the method 400, the inserting 402 the binding barrel member 110 includes limiting 802 further insertion of the binding barrel member 110 into the joining bore 128 through the multiple substrates 102 based on the barrel flange 122 at the distal end 116 of the binding barrel member 110.

In still yet another example of the method 400, the rotating 406 the bolt member 130 includes torquing 902 the bolt member 130 to become fully engaged with the binding barrel member 110.

With reference again to FIGS. 1, 2A-C, 4 and 10, in one or more examples, a method 1000 (see FIG. 10) for joining multiple substrates 102 of a workpiece 104 includes the method 400 of FIG. 4 and continues from 402 to 1002 where the lubricious coating 126 is applied to at least one of an inner counterbored surface 216 of the counterbored barrel portion 119 for the binding barrel member 110 and an outer shank surface 144 of the shank portion 135 for the bolt member 130. In this example, the method 1000 continues from 1002 to 404 of FIG. 4. In another example of the method 1000, an outer shank diameter for the shank portion 135 of the bolt member 130 is substantially greater than an inner counterbored diameter for the counterbored barrel portion 119 of the binding barrel member 110. In yet another example, the method 1000 continues from 402 to 1004 where the lubricious coating 126 is applied to at least one of an inner threaded surface 218 of the threaded barrel portion 120 for the binding barrel member 110 and an outer threaded surface 146 of the threaded bolt portion 134 for the bolt member 130. In still another example of the method 1000, an outer threaded diameter for the threaded bolt portion 134 of the bolt member 130 is substantially greater than an inner threaded diameter for the threaded barrel portion 120 of the binding barrel member 110.

With reference again to FIGS. 1, 2A-C, 4-6, 8, 9, 11 and 12, in another example of the method 400, the threaded bolt portion 134 of the bolt member 130 includes a cylindrical threaded body 145 with an outer threaded surface 146 configured to face the internal threads 121 of the cylindrical barrel body 112 as the bolt member 130 is inserted into the central bore 118 and engaged with the internal threads 121 of the threaded barrel portion 120 for the binding barrel member 110. In a further example, an outer threaded diameter for the cylindrical threaded body 145 is substantially greater than an inner threaded diameter for the internal threads 121 of the threaded barrel portion 120. In another further example of the method 400, the radially expanding 408 includes causing 1102 (see FIG. 11) radial expansion of the threaded barrel portion 120 for the binding barrel member 110 as the bolt member 130 becomes fully engaged with the binding barrel member 110. In this example, the providing 410 of the interference fit 206 includes providing 1104 the interference fit 206 within the joining bore 128 through the multiple substrates 102 in conjunction with a corresponding cylindrical shape of the joining bore 128 as the bolt member 130 becomes fully engaged with the binding barrel member 110.

In yet another example of the method 400, the shank portion 135 of the bolt member 130 includes a cylindrical shank body 143 with an outer shank surface 144 configured to face the counterbored barrel portion 119 of the binding barrel member 110 as the bolt member 130 is inserted into the central bore 118 and engaged with the internal threads 121 of the threaded barrel portion 120 for the binding barrel member 110. In a further example, an outer shank diameter for the cylindrical shank body 143 is substantially greater than an inner counterbored diameter for the counterbored barrel portion 119 of the binding barrel member 110. In another further example of the method 400, the radially expanding 408 includes causing 1202 (see FIG. 12) radial expansion of the counterbored barrel portion 119 for the binding barrel member 110 as the bolt member 130 becomes fully engaged with the binding barrel member 110. In this example, the providing 410 of the interference fit 206 includes providing 1204 the interference fit 206 within the joining bore 128 through the multiple substrates 102 in conjunction with a corresponding cylindrical shape of the joining bore 128 as the bolt member 130 becomes fully engaged with the binding barrel member 110.

Referring generally to FIGS. 1 and 2A-C, by way of examples, the present disclosure is directed to a fastener system 100 for joining multiple substrates 102 of a workpiece 104. The workpiece 104 has a working side 106 and a blind side 108. FIG. 1 discloses a partially installed example of the fastener system 100. FIG. 2A discloses an example of a binding barrel member 110 installed in a substrate of the workpiece from the blind side 108. FIG. 2B discloses an example of the binding barrel member 110 prepared for installation of a substrate of the workpiece from the working side 106. FIG. 2C discloses a fully installed example of the fastener system 100.

With reference again to FIGS. 1 and 2A-C, in one or more examples, a fastener system 100 for joining multiple substrates 102 of a workpiece 104 includes a binding barrel member 110, a cap sealant member 208 and a bolt member 130. The workpiece 104 has a working side 106 and a blind side 108. The binding barrel member 110 includes a cylindrical barrel body 112 with a proximal end 114, a distal end 116, a central bore 118 in the cylindrical barrel body 112 with internal threads 121 and a barrel flange 122 adjacent to the distal end 116 of the cylindrical barrel body 112. The central bore 118 includes a counterbored barrel portion 119 and a threaded barrel portion 120 with internal threads 121. The binding barrel member 110 configured for insertion in a joining bore 128 through at least one substrate 202 of the multiple substrates 102 from the blind side 108 of the workpiece 104. The barrel flange 122 configured to limit further insertion of the binding barrel member 110 into the joining bore 128. The cylindrical barrel body 112 includes an outer barrel surface 124 with a lubricious coating 126. The cap sealant member 208 includes a dome 210 and a cap flange 212. The cap sealant member 208 is configured for placement over the binding barrel member 110. The cap flange 212 configured to secure the cap sealant member 208 to the blind side 108 of the workpiece 104. The bolt member 130 includes a head portion 132, a threaded bolt portion 134 and a shank portion 135 extending between the head portion 132 and the threaded bolt portion 134. The bolt member 130 configured for insertion in the joining bore 128 through the multiple substrates 102 from the working side 106 of the workpiece 104 until a distal end 136 of the bolt member 130 contacts the binding barrel member 110. The threaded bolt portion 134 configured for threaded engagement with the internal threads 121 of the binding barrel member 110 after contacting the binding barrel member 110. At least one of i) an outer threaded diameter 148 for the threaded bolt portion 134 of the bolt member 130 is substantially greater than an inner threaded diameter 150 for the threaded barrel portion 120 of the binding barrel member 110 and ii) an outer shank diameter for the shank portion 135 of the bolt member 130 is substantially greater than an inner counterbored diameter for the counterbored barrel portion 119 of the binding barrel member 110. As the bolt member 130 becomes fully engaged with the binding barrel member 110, the bolt member 130 is configured to cause radial expansion of the binding barrel member 110 and the binding barrel member 110 is configured to provide an interference fit 206 within the joining bore 128 through the multiple substrates 102.

Examples of fastener systems 100 and methods 400, 700, 1000 for joining multiple substrates of a workpiece may be related to or used in the context of aircraft manufacturing. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may apply to the use of composite products in the manufacture of various types of vehicles and in the construction of various types of buildings.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic and/or operational step described in connection with the example is included in at least one aspect, embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item and/or, e.g., a "third" or higher-numbered item.

As used herein, the phrase "at least one of," when used with a list of items, means different combinations of one or more of the listed items may be used and only one of each item in the list may be needed. For example, "at least one of item A, item B and item C" may include, without limitation, item A or item A and item B. This example also may include item A, item B and item C or item B and item C. In other examples, "at least one of" may be, for example, without limitation, two of item A, one of item B and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1, 2A-C and 3A-C, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features and/or components described and illustrated in FIGS. 1, 2A-C and 3A-C, referred to above, need be included in every example and not all elements, features and/or components described herein are necessarily depicted in each illustrative example. Accordingly, some of the elements, features and/or components described and illustrated in FIGS. 1, 2A-C and 3A-C may be combined in various ways without the need to include other features described and illustrated in FIGS. 1, 2A-C and 3A-C, other drawing figures and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1, 2A-C and 3A-C, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features and/or components that serve a similar, or at least substantially similar, purpose are labeled with like numbers in each of FIGS. 1, 2A-C and 3A-C and such elements, features and/or components may not be discussed in detail herein with reference to each of FIGS. 1, 2A-C and 3A-C. Similarly, all elements, features and/or components may not be labeled in each of FIGS. 1, 2A-C and 3A-C, but reference numerals associated therewith may be utilized herein for consistency.

In FIGS. 4-12, referred to above, the blocks may represent operations, steps and/or portions thereof and lines connecting the various blocks do not imply any particular order or dependency of the operations or portions thereof. It will be understood that not all dependencies among the various disclosed operations are necessarily represented. FIGS. 4-12 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages and similar language used throughout the present disclosure may, but does not necessarily, refer to the same example.

Figure 13:
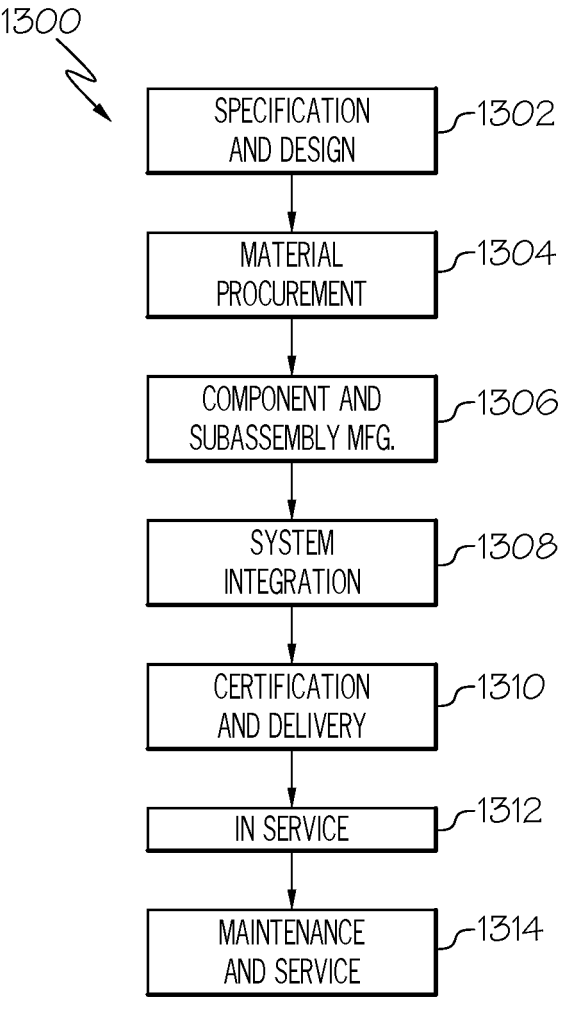
FIG. 13 is a block diagram of aircraft production and service methodology that implements one or more of the examples of methods for joining multiple substrates of a workpiece disclosed herein.
Figure 14:
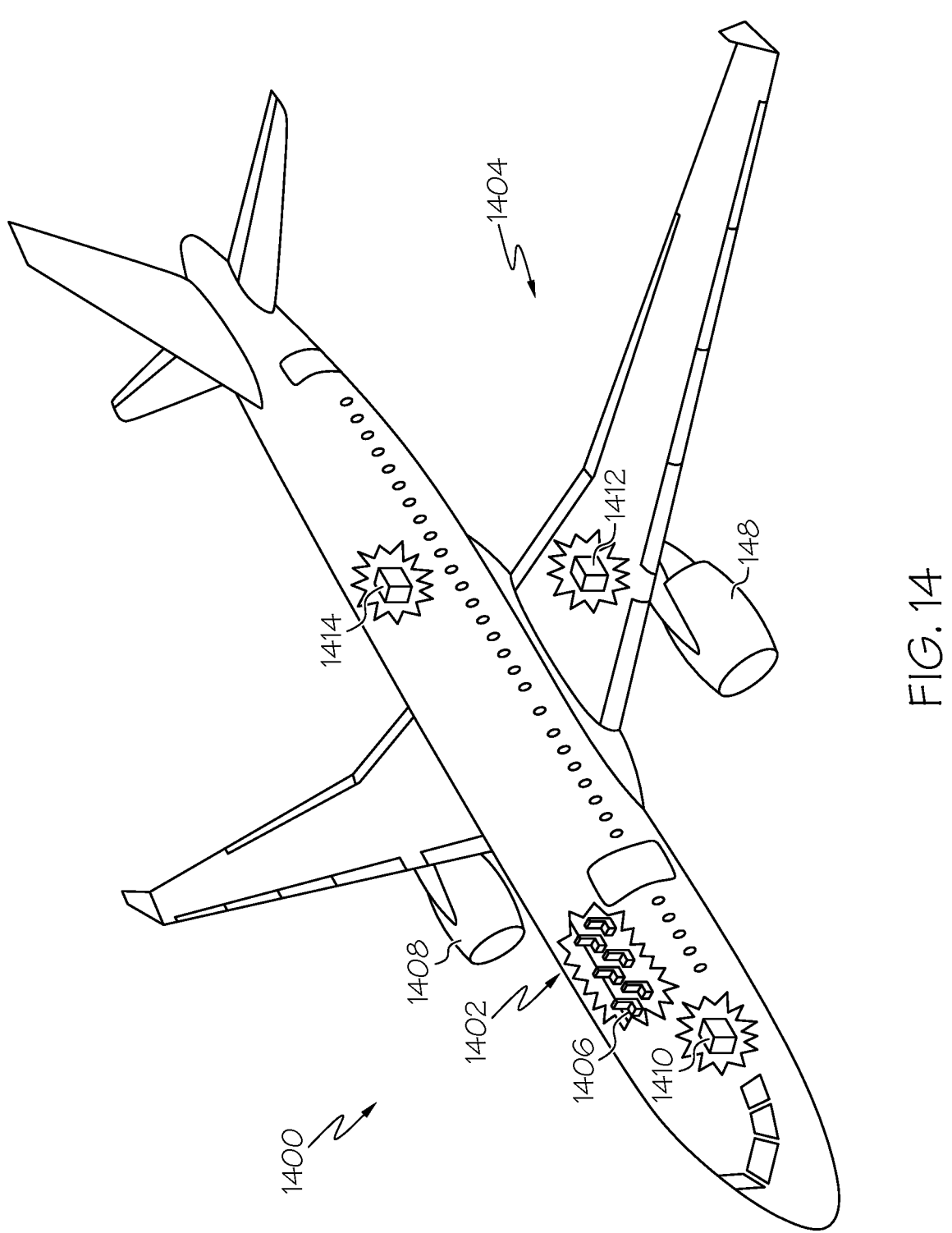
FIG. 14 is a schematic illustration of an aircraft that incorporates workpieces with multiple substrates that are joined using one or more of the examples of fastener systems and methods for joining multiple substrates of a workpiece disclosed herein.

Examples of the subject matter disclosed herein may be described in the context of aircraft manufacturing and service method 1300 as shown in FIG. 13 and aircraft 1400 as shown in FIG. 14. In one or more examples, the disclosed methods and systems for associating test data for a part under test with an end item coordinate system may be used in aircraft manufacturing. During pre-production, the service method 1300 may include specification and design (block 1302) of aircraft 1400 and material procurement (block 1304). During production, component and subassembly manufacturing (block 1306) and system integration (block 1308) of aircraft 1400 may take place. Thereafter, aircraft 1400 may go through certification and delivery (block 1310) to be placed in service (block 1312). While in service, aircraft 1400 may be scheduled for routine maintenance and service (block 1314). Routine maintenance and service may include modification, reconfiguration, refurbishment, etc. of one or more systems of aircraft 1400.

Each of the processes of the service method 1300 may be performed or carried out by a system integrator, a third party and/or an operator (e.g., a customer). For the purposes of this description, a system integrator may include, without limitation, any number of aircraft manufacturers and major-system subcontractors; a third party may include, without limitation, any number of vendors, subcontractors and suppliers; and an operator may be an airline, leasing company, military entity, service organization and so on.

As shown in FIG. 14, aircraft 1400 produced by the service method 1300 may include airframe 1402 with a plurality of high-level systems 1404 and interior 1406. Examples of high-level systems 1404 include one or more of propulsion system 1408, electrical system 1410, hydraulic system 1412 and environmental system 1414. Any number of other systems may be included. Although an aerospace example is shown, the principles disclosed herein may be applied to other industries, such as the automotive industry. Accordingly, in addition to aircraft 1400, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 1300. For example, components or subassemblies corresponding to component and subassembly manufacturing (block 1306) may be fabricated or manufactured in a manner similar to components or subassemblies produced while aircraft 1400 is in service (block 1312). Also, one or more examples of the system(s), method(s), or combination thereof may be utilized during production stages (block 1306 and block 1308), for example, by substantially expediting assembly of or reducing the cost of aircraft 1400. Similarly, one or more examples of the system or method realizations, or a combination thereof, may be utilized, for example and without limitation, while aircraft 1400 is in service (block 1312) and/or during maintenance and service (block 1314).

The described features, advantages and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the fastener systems 100 and methods 400, 700, 1000 for joining multiple substrates of a workpiece have been shown and described, modifications may occur to those skilled in the art upon reading the specification. The present application includes such modifications and is limited only by the scope of the claims.

What is claimed is:

1. A fastener system for joining multiple substrates of a workpiece, the workpiece having a working side and a blind side, the fastener system comprising:

a binding barrel member comprising a cylindrical barrel body with a proximal end, a distal end, a central bore in the cylindrical barrel body and a barrel flange adjacent to the distal end of the cylindrical barrel body, the central bore comprising a counterbored barrel portion and a threaded barrel portion with internal threads, the binding barrel member configured for insertion in a joining bore through at least one substrate of the multiple substrates from the blind side of the workpiece, the barrel flange configured to limit further insertion of the binding barrel member into the joining bore, the cylindrical barrel body comprising an outer barrel surface with a lubricious coating; and a bolt member comprising a head portion, a threaded bolt portion and a shank portion extending between the head portion and the threaded bolt portion, the bolt member configured for insertion in the joining bore through the multiple substrates from the working side of the workpiece until a distal end of the bolt member contacts the binding barrel member, the threaded bolt portion configured for threaded engagement with the internal threads of the binding barrel member after contacting the binding barrel member, wherein, as the bolt member becomes fully engaged with the binding barrel member, the bolt member is configured to cause radial expansion of the binding barrel member and the binding barrel member is configured to provide an interference fit within the joining bore through the multiple substrates, and wherein an outer threaded diameter for the threaded bolt portion of the bolt member is substantially greater than an inner threaded diameter for the threaded barrel portion of the binding barrel member.

2. The fastener system of claim 1 wherein the binding barrel member is configured to be press fit into the joining bore through the at least one substrate of the multiple substrates from the blind side of the workpiece.

3. The fastener system of claim 1 wherein the binding barrel member is configured to be inserted into the joining bore through the at least one substrate of the multiple substrates from the blind side of the workpiece and pulled into a remaining portion of the joining bore from the working side of the workpiece.

4. The fastener system of claim 1, further comprising:

a cap sealant member comprising a dome and a cap flange, the cap sealant member configured for placement over the binding barrel member, the cap flange configured to secure the cap sealant member to the blind side of the workpiece.

5. The fastener system of claim 1 wherein the lubricious coating comprises at least one of indium, an indium alloy, tin, a tin alloy, bismuth, a bismuth alloy, aluminum and an aluminum alloy.

6. The fastener system of claim 1, the head portion of the bolt member comprises a torquing feature.

7. The fastener system of claim 1 wherein, at the working side of the workpiece, the joining bore through the multiple substrates comprises at least one of a countersunk portion, a counterbored portion and a cylindrical portion.

8. The fastener system of claim 1 wherein the binding barrel member further comprises an inner counterbored surface for the counterbored barrel portion, wherein the bolt member further comprises an outer shank surface for the shank portion, wherein at least one of the inner counterbored surface and the outer shank surface is coated with the lubricious coating.

9. The fastener system of claim 1 wherein the binding barrel member further comprises an inner threaded surface for the threaded barrel portion, wherein the bolt member further comprises an outer threaded surface for the threaded bolt portion, wherein at least one of the inner threaded surface and the outer threaded surface is coated with the lubricious coating.

10. The fastener system of claim 1 wherein an outer shank diameter for the shank portion of the bolt member is substantially greater than an inner counterbored diameter for the counterbored barrel portion of the binding barrel member.

11. The fastener system of claim 1, the threaded bolt portion of the bolt member comprising:

a cylindrical threaded body comprising an outer threaded surface configured to face the internal threads of the cylindrical barrel body as the bolt member is inserted into the central bore and engaged with the internal threads of the threaded barrel portion for the binding barrel member.

12. The fastener system of claim 11 wherein an outer threaded diameter for the cylindrical threaded body is greater than an inner threaded diameter for the internal threads.

13. The fastener system of claim 11 wherein, as the bolt member becomes fully engaged with the binding barrel member, the outer threaded surface of the bolt member is configured to cause radial expansion of the threaded barrel portion for the binding barrel member and the binding barrel member is configured to provide the interference fit within the joining bore through the multiple substrates in conjunction with a corresponding cylindrical shape of the joining bore.

14. The fastener system of claim 1, the shank portion of the bolt member comprising:

a cylindrical shank body comprising an outer shank surface configured to face the counterbored barrel portion of the binding barrel member as the bolt member is inserted into the central bore and engaged with the internal threads of the threaded barrel portion for the binding barrel member.

15. The fastener system of claim 14 wherein an outer shank diameter for the cylindrical shank body is substantially greater than an inner counterbored diameter for the counterbored barrel portion of the binding barrel member.

16. The fastener system of claim 14 wherein, as the bolt member becomes fully engaged with the binding barrel member, the outer shank surface of the bolt member is configured to cause radial expansion of the counterbored barrel portion for the binding barrel member and the binding barrel member is configured to provide the interference fit within the joining bore through the multiple substrates in conjunction with a corresponding cylindrical shape of the joining bore.

17. The fastener system of claim 1 wherein the lubricious coating on the outer barrel surface comprises conductive features configured to provide electromagnetic energy protection to the workpiece as the bolt member becomes fully engaged with the binding barrel member.

18. The fastener system of claim 1 wherein the outer barrel surface is coated with a conductive coating to provide electromagnetic energy protection to the workpiece as the bolt member becomes fully engaged with the binding barrel member.

19. A method for joining multiple substrates of a workpiece, the workpiece having a working side and a blind side, the method comprising:

inserting a binding barrel member in a joining bore through at least one substrate of the multiple substrates from the blind side of the workpiece, the binding barrel member comprising a cylindrical barrel body with a proximal end, a distal end and a central bore in the cylindrical barrel body, the central bore comprising a counterbored barrel portion and a threaded barrel portion with internal threads, the binding barrel member further comprising a barrel flange adjacent to the distal end of the cylindrical barrel body, the barrel flange configured to limit further insertion of the binding barrel member into the joining bore, the cylindrical barrel body further comprising an outer barrel surface with a lubricious coating;

inserting a bolt member in the joining bore through the multiple substrates from the working side of the workpiece until a distal end of the bolt member contacts the binding barrel member, the bolt member comprising a head portion, a threaded bolt portion and a shank portion extending between the head portion and the threaded bolt portion;

rotating the bolt member to engage the threaded bolt portion with the internal threads of the binding barrel member;

radially expanding the binding barrel member within the joining bore through the multiple substrates as the bolt member becomes fully engaged with the binding barrel member; and providing an interference fit for the binding barrel member within the joining bore through the multiple substrates in response to radial expansion of the binding barrel member as the bolt member becomes fully engaged with the binding barrel member, and wherein an outer threaded diameter for the threaded bolt portion of the bolt member is substantially greater than an inner threaded diameter for the threaded barrel portion of the binding barrel member.

20. A fastener system for joining multiple substrates of a workpiece, the multiple substrates comprising at least one composite material substrate, the workpiece having a working side and a blind side, the fastener system comprising:

a binding barrel member comprising a cylindrical barrel body with a proximal end, a distal end, a central bore in the cylindrical barrel body with internal threads and a barrel flange adjacent to the distal end of the cylindrical barrel body, the central bore comprising a counterbored barrel portion and a threaded barrel portion with internal threads, the binding barrel member configured for insertion in a joining bore through at least one substrate of the multiple substrates from the blind side of the workpiece, the barrel flange configured to limit further insertion of the binding barrel member into the joining bore, the cylindrical barrel body comprising an outer barrel surface with a lubricious coating;

a cap sealant member comprising a dome and a cap flange, the cap sealant member configured for placement over the binding barrel member, the cap flange configured to secure the cap sealant member to the blind side of the workpiece; and a bolt member comprising a head portion, a threaded bolt portion and a shank portion extending between the head portion and the threaded bolt portion, the bolt member configured for insertion in the joining bore through the multiple substrates from the working side of the workpiece until a distal end of the bolt member contacts the binding barrel member, the threaded bolt portion configured for threaded engagement with the internal threads of the binding barrel member after contacting the binding barrel member, wherein an outer threaded diameter for the threaded bolt portion of the bolt member is substantially greater than an inner threaded diameter for the threaded barrel portion of the binding barrel member, and wherein, as the bolt member becomes fully engaged with the binding barrel member, the bolt member is configured to cause radial expansion of the binding barrel member and the binding barrel member is configured to provide an interference fit within the joining bore through the multiple substrates.

* * * * *